US012156301B2

(12) United States Patent
Dinauer et al.

(10) Patent No.: US 12,156,301 B2
(45) Date of Patent: Nov. 26, 2024

(54) THREE PHASE MEDIUM VOLTAGE HEATER

(71) Applicant: Watlow Electric Manufacturing Company, St. Louis, MO (US)

(72) Inventors: Ethan Dinauer, St. Louis, MO (US); Dennis Long, St. Louis, MO (US); Scott Boehmer, Hannibal, MO (US)

(73) Assignee: Watlow Electric Manufacturing Company, St. Louis, MO (US)

( * ) Notice: Subject to any disclaimer, the term of this patent is extended or adjusted under 35 U.S.C. 154(b) by 1060 days.

(21) Appl. No.: 17/087,032

(22) Filed: Nov. 2, 2020

(65) Prior Publication Data

US 2021/0136876 A1 May 6, 2021

Related U.S. Application Data

(60) Provisional application No. 62/929,507, filed on Nov. 1, 2019.

(51) Int. Cl.
*H05B 3/06* (2006.01)

(52) U.S. Cl.
CPC ......... *H05B 3/06* (2013.01); *H05B 2203/016* (2013.01); *H05B 2203/035* (2013.01)

(58) Field of Classification Search
None
See application file for complete search history.

(56) References Cited

U.S. PATENT DOCUMENTS

| | | | | |
|---|---|---|---|---|
| 2,868,944 A * | 1/1959 | Koch | F24H 1/102 | 392/492 |
| 3,230,346 A * | 1/1966 | Eckerfeld | F24H 1/103 | 392/494 |
| 4,567,350 A * | 1/1986 | Todd, Jr. | F24H 15/219 | 392/489 |
| 7,372,007 B1 | 5/2008 | Mcclanahan et al. | | |

(Continued)

FOREIGN PATENT DOCUMENTS

| | | |
|---|---|---|
| DE | 1440508 | 11/1968 |
| DE | 2916451 | 11/1980 |
| WO | 2013045783 | 4/2013 |

OTHER PUBLICATIONS

International Search Report for International Application PCT/US2020/058539, mailed Feb. 19, 2021.

*Primary Examiner* — Thor S Campbell
(74) *Attorney, Agent, or Firm* — Burris Law, PLLC

(57) ABSTRACT

An electric heater includes a first busbar, a second busbar, a third busbar, a neutral busbar, a plurality of first heating elements, a plurality of second heating elements, and a plurality of third heating element. A first end of each first heating element is coupled to the first busbar for electrical communication therewith. A second end of each first heating element is coupled to the neutral busbar for electrical communication therewith. A first end of each second heating element is coupled to the second busbar for electrical communication therewith. A second end of each second heating element is coupled to the neutral busbar for electrical communication therewith. A first end of each third heating element is coupled to the third busbar for electrical communication therewith. A second end of each third heating element is coupled to the neutral busbar for electrical communication therewith.

20 Claims, 13 Drawing Sheets

(56) References Cited

U.S. PATENT DOCUMENTS

| | | | | |
|---|---|---|---|---|
| 9,301,341 | B2 | 3/2016 | Riley et al. | |
| 2011/0042387 | A1* | 2/2011 | Henry | H05B 3/82 392/501 |
| 2013/0264330 | A1* | 10/2013 | McClanahan | H05B 3/48 219/520 |
| 2017/0130887 | A1 | 5/2017 | Eder | |
| 2019/0063853 | A1 | 2/2019 | Tatavarthy et al. | |
| 2021/0190379 | A1* | 6/2021 | Everly | F24H 9/2028 |
| 2022/0196283 | A1* | 6/2022 | Lindley | H05B 1/0244 |
| 2023/0337332 | A1* | 10/2023 | Jones | H05B 3/48 |
| 2024/0053055 | A1* | 2/2024 | Kim | H05B 3/03 |

* cited by examiner

THREE PHASE MEDIUM VOLTAGE HEATER

CROSS-REFERENCE TO RELATED APPLICATIONS

This application claims priority to and the benefit of U.S. Provisional Application No. 62/929,507 filed on Nov. 1, 2019. The disclosure of the above application is incorporated herein by reference.

FIELD

The present disclosure relates to medium voltage electrical resistance heaters.

BACKGROUND

The statements in this section merely provide background information related to the present disclosure and may not constitute prior art.

Industrial electric heaters generally heat materials such as solids, liquids, or gasses with resistance heating elements that convert electrical power to heat. In some applications the resistance heating elements are submerged in the liquid or gas or the liquid or gas flows between the resistance heating elements. In some applications, a large amount of power is needed to bring the material to the desired temperature. For example, some applications require power greater than 1 megawatt, with some applications being in the range of 5 megawatts or greater. Typical low voltage electric heaters operate at around 700 volts but can require high electrical current (e.g., over 7,000 amps) to achieve the power required. The high current can require large and expensive power components, cables, and grounding strategies. Additionally, some industrial power sources require a step-down transformer to supply the low voltage.

The present disclosure addresses these and other problems with traditional electric resistance heaters.

SUMMARY

According to one form, an electric heater includes a first busbar, a second busbar, a third busbar, a neutral busbar, a plurality of first heating elements, a plurality of second heating elements, and a plurality of third heating element. A first end of each first heating element is coupled to the first busbar for electrical communication therewith. A second end of each first heating element is coupled to the neutral busbar for electrical communication therewith. A first end of each second heating element is coupled to the second busbar for electrical communication therewith. A second end of each second heating element is coupled to the neutral busbar for electrical communication therewith. A first end of each third heating element is coupled to the third busbar for electrical communication therewith. A second end of each third heating element is coupled to the neutral busbar for electrical communication therewith. According to a plurality of alternate forms, which may be employed individually or in any combination even if not explicitly illustrated together: the electric heater further includes a first end wall, the first ends of the first, second, and third heating elements extending through the first end wall, the first end wall isolating the first, second, and third busbars from a heating portion of the electric heater, the heating portion being configured to output heat to a working fluid; the first, second, and third busbars are separated from each other by insulator plates; the electric heater further includes a neutral cable, a first end of the neutral cable extending through the first end wall, a second end of the neutral cable being coupled to the neutral busbar for electrical communication therewith; the first, second, and third busbars are disposed radially outward of the first end of the neutral cable and are electrically insulated therefrom by an insulator ring disposed about the neutral cable; the electric heater further including a central support tube extending between the first end wall and the neutral busbar, the first, second, and third heating elements being arranged about the central support tube, wherein the neutral cable extends within the central tube; the electric heater further including a plurality of insulator plates, each insulator plate being disposed between adjacent ones of the first, second, and third busbars; the neutral busbar is configured to be in contact with a working fluid of the electric heater; the electric heater further including a second end wall, the second ends of the first, second, and third heating elements extending through the second end wall, the second end wall isolating the neutral busbar from the heating portion of the electric heater; the electric heater further including a plurality of spacers configured to space the neutral busbar apart from the second end wall; the first, second, and third busbars are surrounded by dielectric potting material; the electric heater further includes a first electrical terminal, a second electrical terminal, and a third electrical terminal, the first electrical terminal coupled to the first busbar and extending through the dielectric potting material, the second electrical terminal coupled to the second busbar and extending through the dielectric potting material, the third electrical terminal coupled to the third busbar and extending through the dielectric potting material; the first electrical terminal is configured to be electrically coupled to a first phase of a three-phase power source, the second electrical terminal is configured to be electrically coupled to a second phase of the three-phase power source, and the third electrical terminal is configured to be electrically coupled to a third phase of the three-phase power source; the neutral busbar defines a bore configured to permit a working fluid to flow through; the electric heater further comprising a tube, a first inlet/outlet, and a second inlet/outlet, wherein the first, second, and third heating elements are disposed within a flow path of the tube, wherein the first inlet/outlet is in fluid communication with the flow path and is proximate to the first ends of the first, second, and third heating elements, wherein the second inlet/outlet is in fluid communication with the flow path and is proximate to the second ends of the first, second, and third heating elements.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
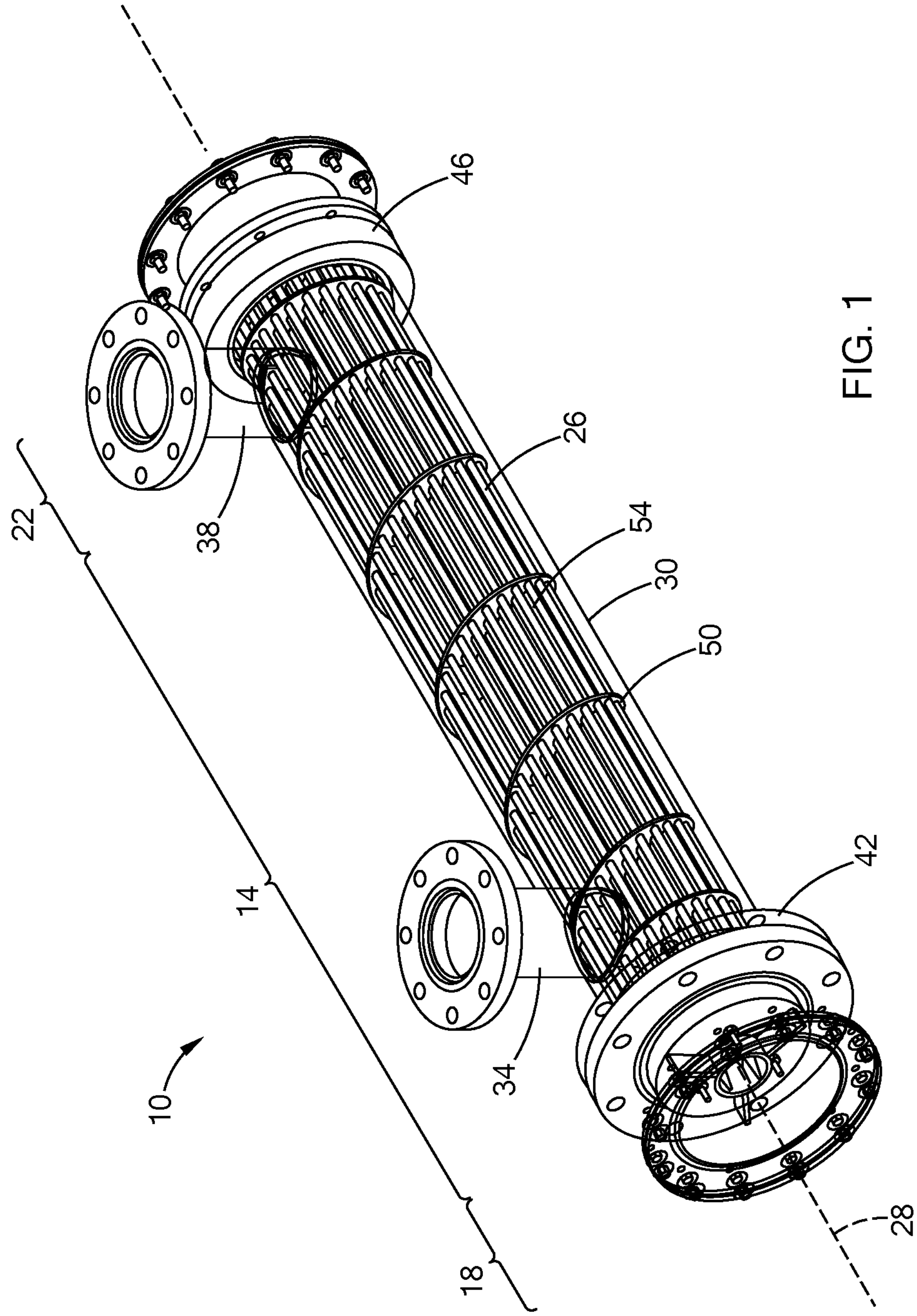
FIG. 1 is a perspective view of an electric heater, shown with a transparent outer tube or sheath for purposes of clarity, in accordance with the teachings of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 2:
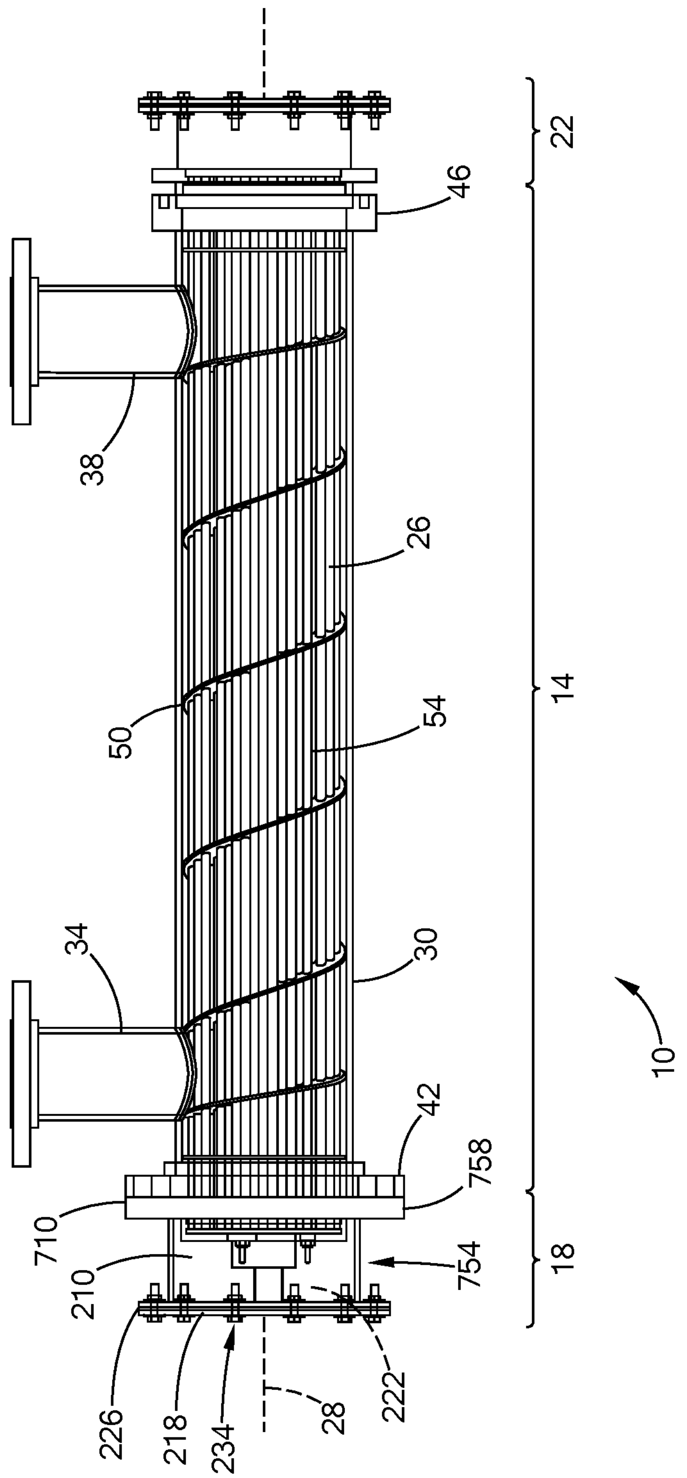
FIG. 2 is a side view of the electric heater of FIG. 1.

Referring to FIGS. 1 and 2, an example electric heater 10 is illustrated. The electric heater 10 includes a heating portion 14, a power supply portion 18, and a neutral terminal portion 22. The heating portion 14 includes a plurality of electrical resistance heating elements 26 that extend parallel to a central axis 28 of the electric heater 10 between the power supply portion 18 and the neutral terminal portion 22. In the example provided, the electric heater 10 is disposed within a tube 30 having a first port or inlet/outlet 34 proximate to the power supply portion 18 and a second port or inlet/outlet 38 proximate to the neutral terminal portion 22. The tube 30 is illustrated as transparent for clarity purposes to better illustrate the components within the tube 30. In the example provided, the tube 30 is metal and opaque, though other configurations can be used. Fluid can be pumped into the tube 30 via one of the inlet/outlets 34, 38 and it flows through the tube 30 in contact with the heating elements 26 until it exits via the other inlet/outlet 34, 38. In the example provided, the fluid flows in the first inlet/outlet 34 and out the second inlet/outlet 38, though the flow may be reversed. It should be understood that the term “fluid” is to be construed to include solids, liquids, gases, and plasmas, among other material states while remaining within the scope of the present disclosure.

The tube 30 includes a first shell flange 42 and a second shell flange 46. The first shell flange 42 is disposed between the power supply portion 18 and the first inlet/outlet 34 configured to couple the tube 30 to the power supply portion 18. The second shell flange 46 is disposed between the neutral terminal portion 22 and the second inlet/outlet 38 configured to couple the tube 30 to the neutral terminal portion 22.

A baffle 50 may also optionally be disposed within the tube 30. In the example provided, the baffle 50 is a continuous helical shape and directs the flow of the fluid along a helical flow pathway 54 between the two inlet/outlets 34, 38, though other configurations can be used. The baffle 50 can also act as a support member that supports the heating elements 26 relative to each other and relative to the tube 30. In one configuration, the baffle 50 and tube 30 may be similar to those shown and described in U.S. Publication No. 2019/0063853, which is commonly owned with the present application and the entire disclosure of which is incorporated herein by reference. While illustrated and described with reference to heating a fluid flowing through the tube 30, the electric heater 10 may be used without the tube 30 in other applications such as submersion heating for example.

Figure 3:
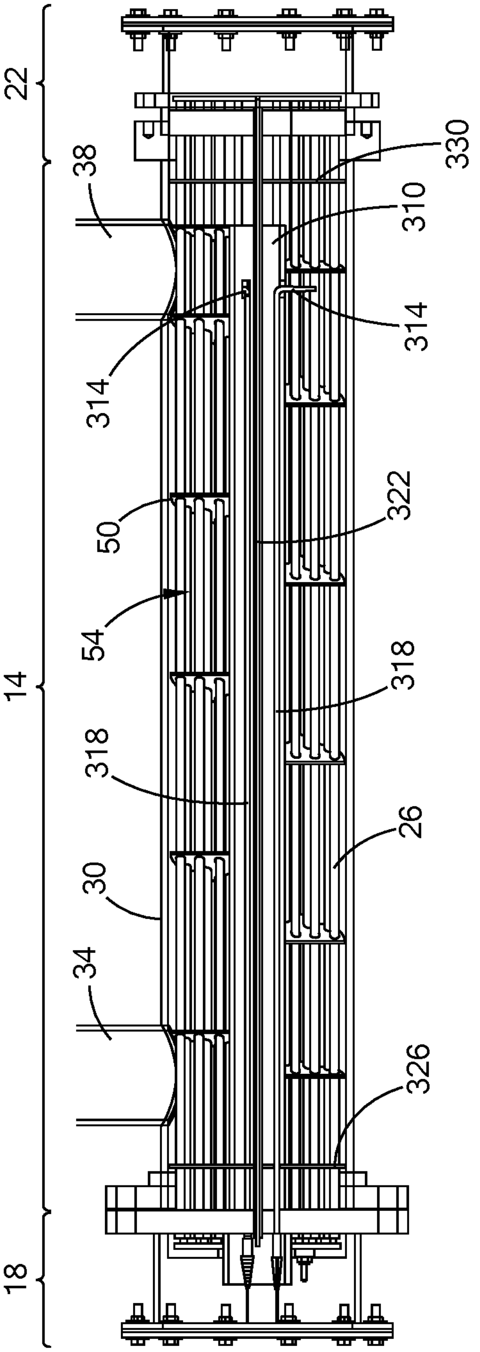
FIG. 3 is a side cross-sectional view of the electric heater of FIG. 1.
Figure 4:
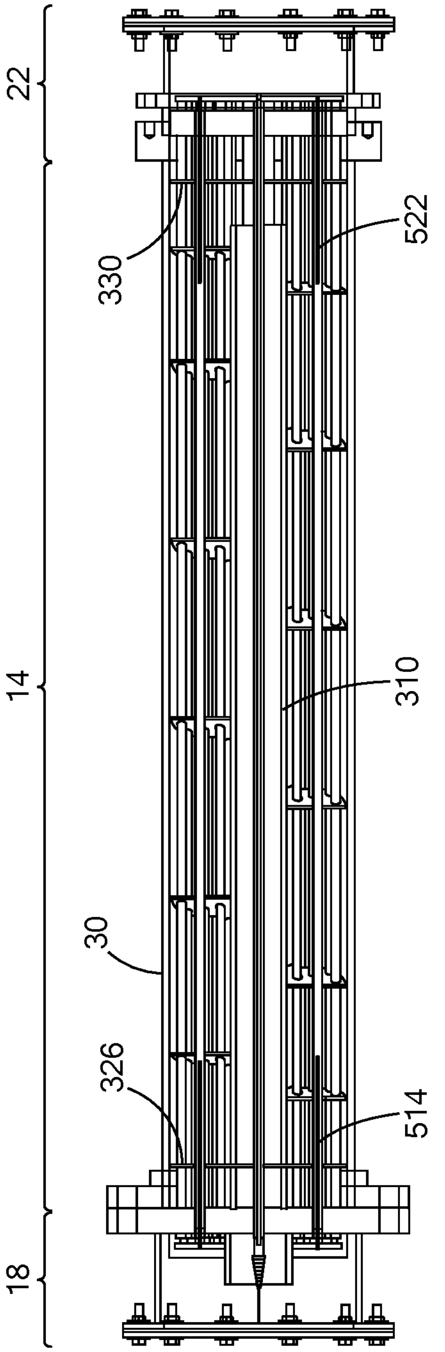
FIG. 4 is a top cross-sectional view of the electric heater of FIG. 1.

Referring to FIGS. 3 and 4, the heating portion 14 can also optionally include a center support tube 310 extending coaxially within the tube 30 from the power supply portion 18 to a location within the heating portion 14 proximate to the neutral terminal portion 22. The center support tube 310 can support the baffle 50 within the tube 30. One or more sensors 314 can extend from the center support tube 310 into the flow pathway 54. In an alternative configuration, not specifically shown, sensors can extend through the side of the tube 30, the first inlet/outlet 34, and/or the second inlet/outlet 38. In the example provided, the sensors 314 are mineral insulated temperature sensors, though the sensors can be any suitable type of sensor. Electrical leads or cables 318 extend from the sensors 314 through the center support tube 310 to the power supply portion 18. A neutral cable 322 may optionally also extend from the power supply portion 18, through the center support tube 310 to the neutral terminal portion 22. In an alternative configuration, not specifically shown, the neutral cable 322 can be omitted. In one alternative configuration, not specifically shown, the center support tube 310 can be omitted. In one example of such a configuration, the baffles 50 may extend fully radially inward to the axis 28 (FIG. 2), though other configurations can be used.

In the example provided, a first end plate 326 may be disposed between the first inlet/outlet 34 and the power supply portion 18. The first end plate 326 may be a radiation heat shield to reflect heat radiating from the heating elements 26 back to the flow pathway 54. The first end plate 326 may also inhibit back-flow from the first inlet/outlet 34 toward the power supply portion 18. A second end plate 330 may be disposed between the second inlet/outlet 38 and the neutral terminal portion 22. The second end plate 330 may be a radiation heat shield to reflect heat radiating from the heating elements 26 back to the flow pathway 54. The second end plate 330 may also inhibit flow past the second inlet/outlet 38 toward the neutral terminal portion 22.

Figure 5:
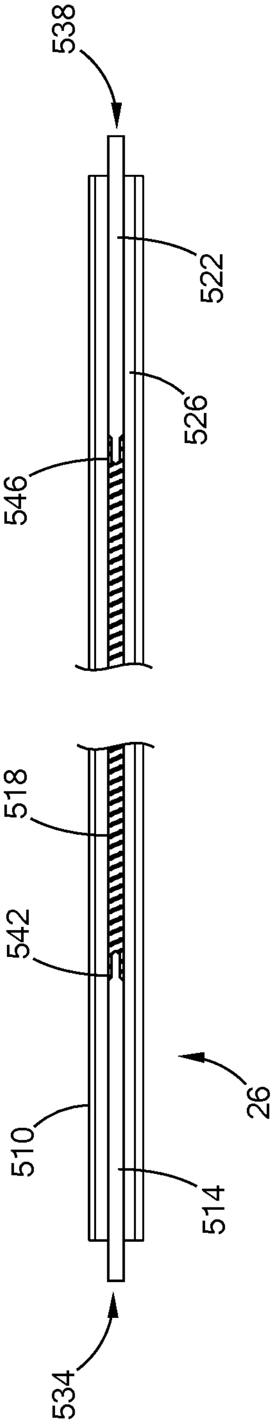
FIG. 5 is a cross-sectional view of a heating element of the electric heater of FIG. 1.
Figure 6:
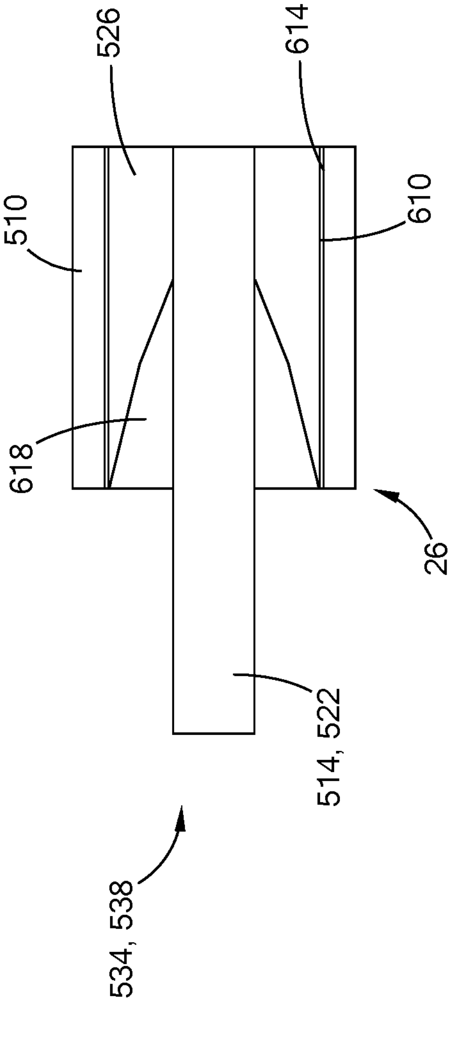
FIG. 6 is a cross-sectional view of an end of the heating element of FIG. 5.

Referring to FIGS. 5 and 6, each heating element 26 includes a tubular sheath 510, a low resistance supply pin 514, a resistive element 518, a low resistance neutral pin 522, and insulating material 526. In the example provided, each heating element 26 is straight and parallel to the central axis 28 (FIGS. 1 and 2), though other configurations can be used. While only one end of the heating element 26 is illustrated in FIG. 6, the reference numerals corresponding to features of both ends 534, 538 are shown since both ends 534, 538 may be constructed similarly. In an alternative configuration, not shown, the ends 534, 538 may be constructed differently from each other. In the example provided, the insulating material 526 is compacted mineral insulation powder (e.g., magnesium oxide) and the sheath 510 also includes a high dielectric strength coating 610 disposed on an interior surface 614 of the sheath 510. The coating 610 can be any suitable type of high dielectric strength coating, which may be applied using processes including, but not limited, to thin film, thick film, thermal spray, dipping, and sol-gel, among others. In one example, the coating has a dielectric strength of at least 1000 volts per mil (i.e., 1000 volts per 0.0254 millimeters), though other dielectric strength values can be used depending on the particular application. In one form, the supply pin 514 and neutral pin 522 are disposed within the sheath 510 and can be coaxial with the sheath 510.

In an alternative configuration, not specifically shown, the coating 610 can be disposed on the surfaces of the pins 514, 522 and the resistive element 518 but not on the interior surface 614 of the sheath 510, or can be disposed on the interior surface 614 and the surfaces of the pins 514, 522 and the resistive element 518.

As shown in FIG. 5, the supply pin 514 extends from the one end 534 of the heating element 26 beyond the sheath 510 and the neutral pin 522 extends from the opposite end 538 beyond the sheath 510. Referring to FIG. 4, the supply pin 514 extends from the power supply portion 18 into the heating portion 14 but terminates within the heating portion 14. In the example provided, the supply pin 514 terminates after the first end plate 326 and at or before the first inlet/outlet 34 (FIG. 3), though other configurations can be used. The neutral pin 522 extends from the neutral terminal portion 22 into the heating portion 14 but terminates after the second end plate 330 and at or before the second inlet/outlet 38 (FIG. 3), though other configurations can be used.

Returning to FIG. 6, the insulating material 526 is disposed about the pins 514, 522 such that it is between the pins 514, 522 and the coating 610 of the sheath 510 and electrically insulates the pins 514, 522 from the sheath 510. At each end 534, 538 of the heating element 26, the insulating material 526 can thin to define a cavity 618 between the pin 514, 522 and the insulating material 526. In the example provided, the cavity 618 has a concave parabolic shape open out the corresponding end 534, 538, though other configurations can be used including the cavity 618 having a non-parabolic shape or the cavity 618 being omitted such that the end 534, 538 is fully filled with the insulating material for example. In one alternative configuration, not specifically shown, the insulating material 526 can form a convex shape facing in the direction outward relative to the corresponding end 534, 538. In one such example, not specifically shown, a parabolic shape can have a convex parabolic surface facing generally out of the corresponding end 534, 538.

Referring to FIG. 5, the resistive element 518 is disposed within the sheath 510. The resistive element 518 is an electrically conductive element that has a high resistance such that it emits heat when a voltage is provided across it. In the example provided, the resistive element 518 is a wire that is wound in a coil about the axis of the sheath 510. Accordingly, the resistive element 518 may be part of a cartridge heater or a tubular heater type construction, among others. One end 542 of the resistive element 518 is electrically coupled to the supply pin 514 (e.g. welded). The other end 546 of the resistive element 518 is electrically coupled to the neutral pin 522 (e.g. welded). Thus, the resistive element 518 is disposed within the heating portion 14 (FIG. 4). The insulating material 526 is also disposed about the resistive element 518 such that it is between the resistive element 518 and the sheath 510 to insulate the sheath 510 from the resistive element 518. The insulating material 526 is not shown within the coil of the resistive element 518 to better show the coiled nature of the resistive element 518. However, in the example provided, the insulating material 526 fills the region radially within the coils and axially between the coils of the resistive element 518. In the example provided, an outer diameter of the resistive element 518 is no greater than the outer diameter of the supply pin 514 and the neutral pin 522, though other configurations can be used. While described and shown herein with reference to a coiled resistive element 518, the resistive element 518 can be any suitable type of resistive element including non-coiled resistive elements (e.g., cable heaters).

Figure 7:
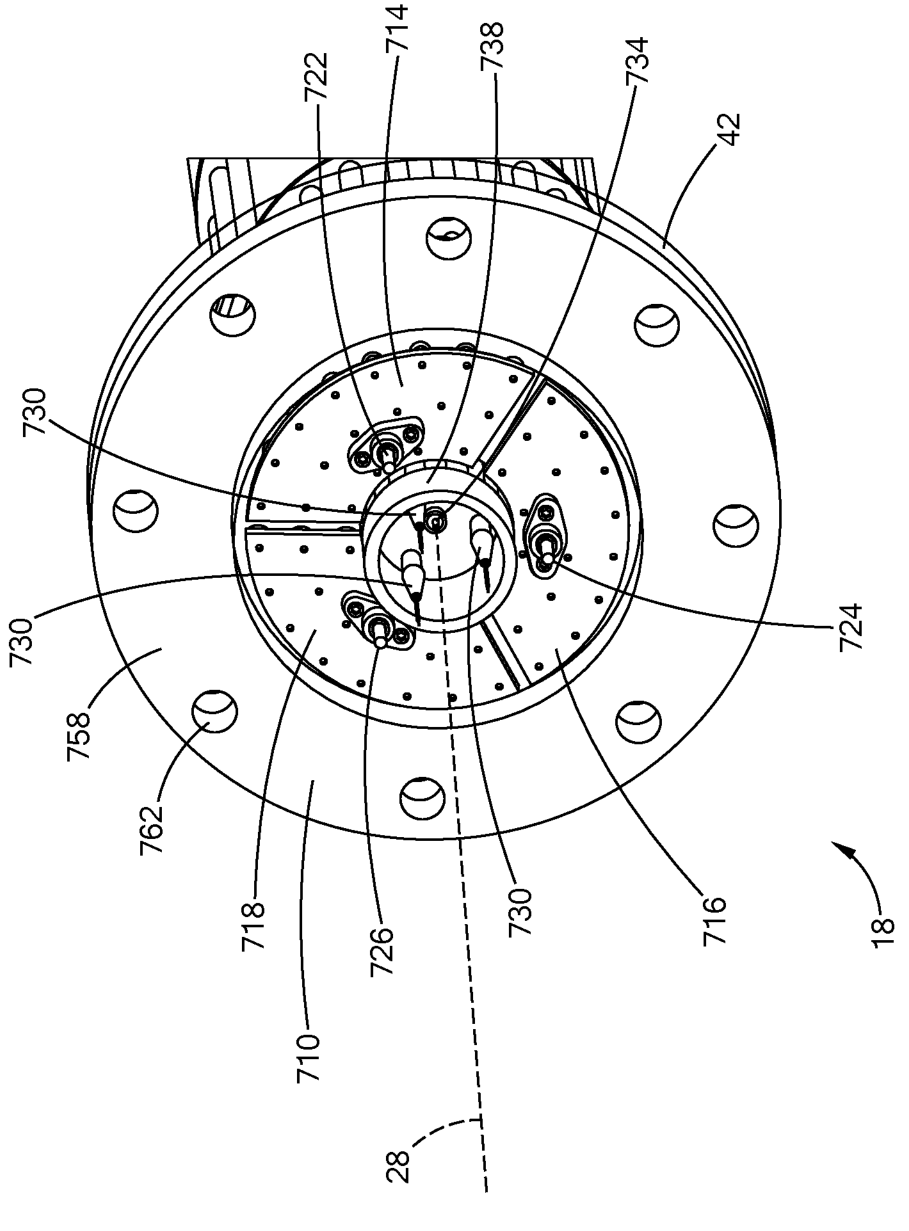
FIG. 7 is a perspective view of a power supply portion of the electric heater of FIG. 1, illustrating a busbar arrangement in accordance with the teachings of the present disclosure.
Figure 8:
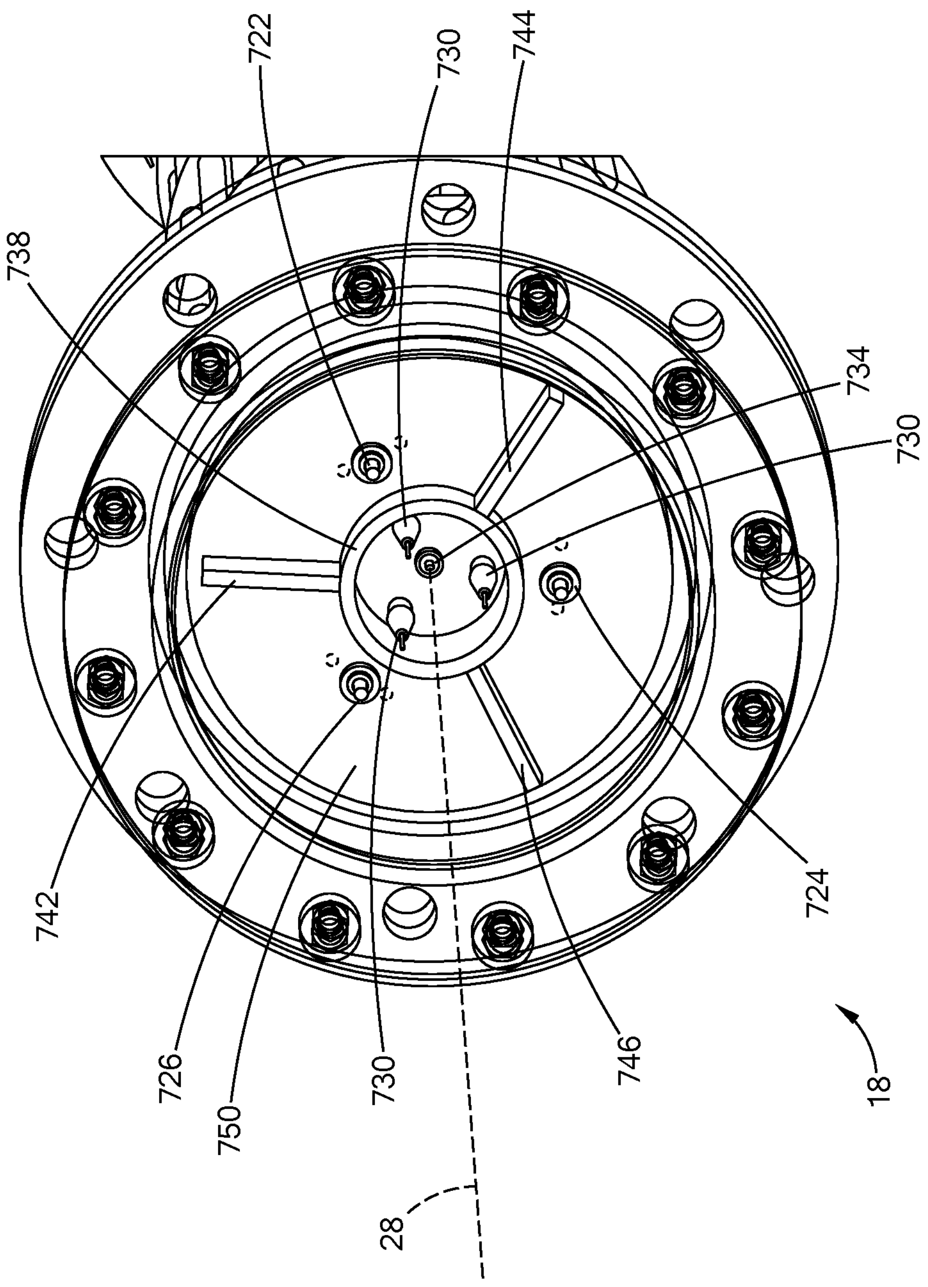
FIG. 8 is a perspective view similar to FIG. 7, illustrating a potting compound disposed about the busbars of FIG. 7 in accordance with the teachings of the present disclosure.

Referring to FIG. 7, the power supply portion 18 includes an end wall or tube sheet 710, a first busbar 714, a second busbar 716, a third busbar 718, a first electrical distribution terminal or post 722, a second electrical distribution terminal or post 724, and a third electrical distribution terminal or post 726. The power supply portion 18 may also optionally include one or more sensor connection points 730, a neutral connection point 734 and an insulator ring 738. Referring to FIG. 8, the power supply portion 18 may optionally further include a first insulator plate 742, a second insulator plate 744, a third insulator plate 746, and an insulator body 750. Referring back to FIG. 2, the power supply portion 18 also includes a terminal enclosure 754.

Referring to FIG. 7, the tube sheet 710 is a generally disc shaped body that closes and seals one end of the tube 30 (FIGS. 1-4). In the example provided, the tube sheet 710 includes a flanged portion 758 that aligns with the first shell flange 42. In the example provided, fasteners (e.g., bolts; not shown) extend through bores 762 in the flanged portion 758 and first shell flange 42 to removably couple the flange 42 to the tube sheet 710. A seal member or gasket (not shown) can be disposed between the flange 42 and the tube sheet 710 to provide sealing engagement therebetween. In an alternative configuration, not specifically shown, the tube sheet 710 can be directly welded to the flange 43 or the tube 30. In another alternative configuration, not specifically shown, a standoff tube can separate the flange 43 from the first shell flange 42 to axially separate the power supply portion 18 from the heating portion 14.

Figure 10:
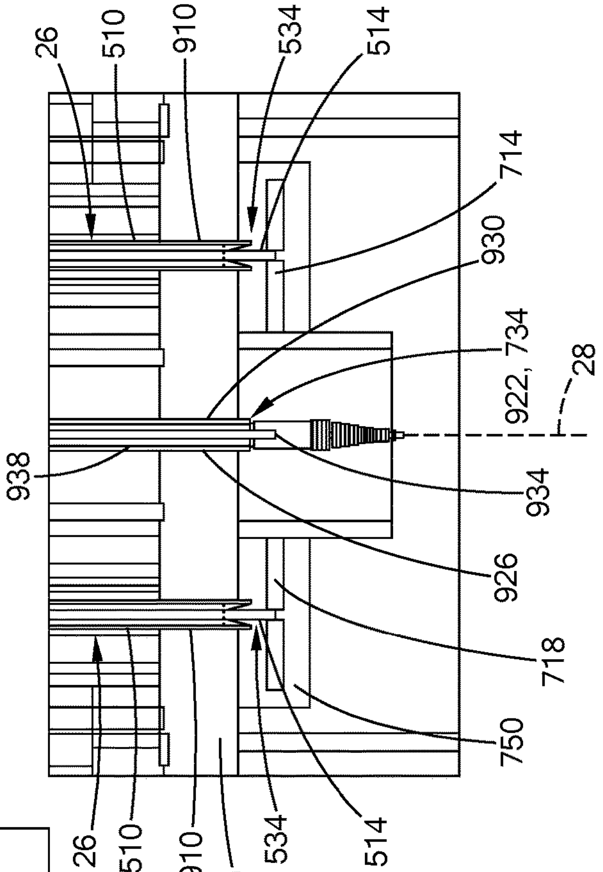
FIG. 10 is a top cross-sectional view of the power supply portion of FIG. 8.
Figure 9:
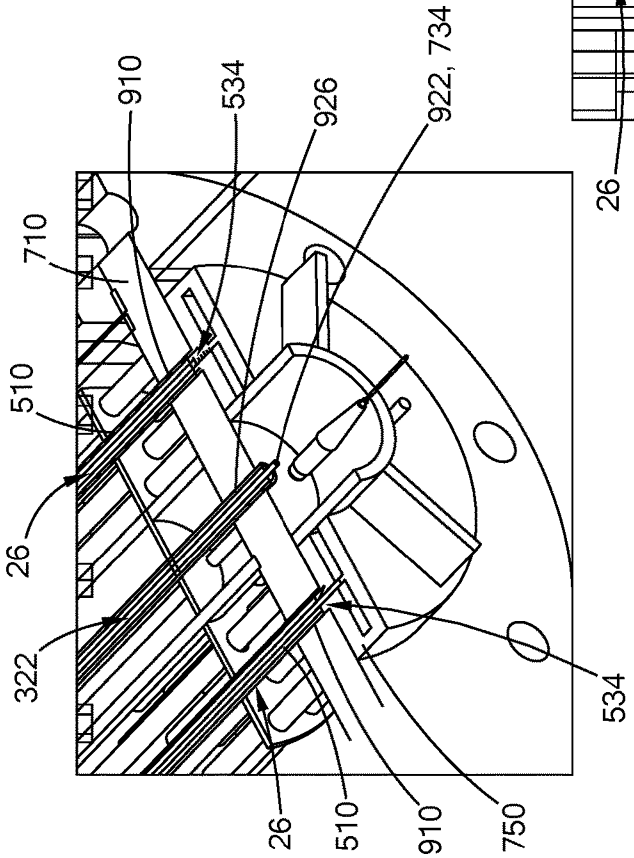
FIG. 9 is a perspective cross-sectional view of a power supply portion of FIG. 8.

Referring to FIGS. 9 and 10, the end 534 of each heating element 26 extends into and through bores 910 in the tube sheet 710 in a sealed manner that inhibits fluid from traversing the tube sheet 710 through the bores 910. For example, each sheath 510 can be welded to the tube sheet

Figure 11:
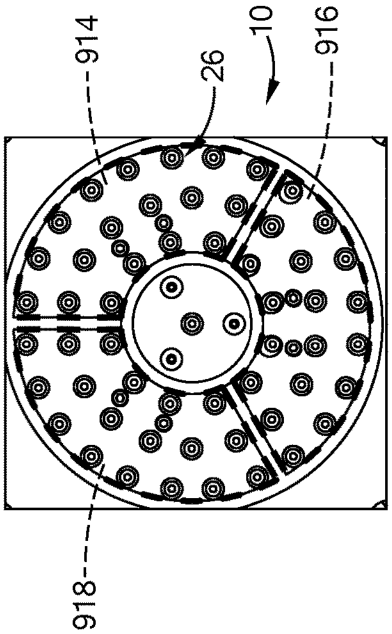
FIG. 11 is a front view of an arrangement of heating elements in the electric heater of FIG. 1 in accordance with the teachings of the present disclosure.

710, though other configurations can be used. Referring to FIG. 11, the heating elements 26 can be arranged in concentric circles about the central axis 28 of the electric heater 10. In one form, the heating elements 26 are also separated into three regions 914, 916, 918 with an equal number of heating elements 26 in each region 914, 916, 918 to maintain a balanced thermal load configuration.

Referring to FIGS. 7, 10 and 11, the supply pin 514 of each heating element 26 in region 914 is electrically coupled (e.g., welded) to the first busbar 714. The supply pin 514 of each heating element 26 in region 916 is electrically coupled (e.g., welded) to the second busbar 716. The supply pin 514 of each heating element 26 in region 918 is electrically coupled (e.g., welded) to the third busbar 718. The busbars 714, 716, 718 are spaced apart from each other in the circumferential direction about the central axis 28 but are generally located in the same plane in the axial direction. The first electrical distribution post 722 is electrically coupled to the first busbar 714. In the example provided, the first electrical distribution post 722 is mounted to the first busbar 714, though other configurations can be used. The second electrical distribution post 724 is electrically coupled to the second busbar 716. In the example provided, the second electrical distribution post 724 is mounted to the second busbar 716, though other configurations can be used. The third electrical distribution post 726 is electrically coupled to the third busbar 718. In the example provided, the third electrical distribution post 726 is mounted to the third busbar 718, though other configurations can be used. As described in greater detail below, each busbar 714, 716, 718 thus can handle a corresponding phase of three-phase input power.

In an alternative configuration, not specifically shown, each busbar 714, 716, 718 can have more than one electrical distribution post. For example, the first busbar 714 may have two or more electrical distribution posts (similar to the first electrical distribution post 722) connected to the first phase of input power. Likewise, the second busbar 716 can have two or more electrical distribution posts (similar to the second electrical distribution post 724) connected to the second phase of input power and the third busbar 718 can have two or more electrical distribution posts (similar to the third electrical distribution post 726) connected to the third phase of input power.

Referring to FIGS. 9 and 10, an end 922 of the neutral cable 322 extends into and through a hole 926 in the tube sheet 710 in a sealed manner that inhibits fluid from traversing the tube sheet 710 through the hole 926. In the example provided, the neutral cable 322 is a mineral insulated cable including a rigid sheath 930, a wire or pin 934 disposed coaxially within the sheath 930, and an electrically insulating material 938 disposed about the pin 934 between the pin 934 and the sheath 930 to electrically insulate the pin 934 from the sheath 930. In the example provided the insulating material 938 is a compacted mineral insulation powder (e.g., magnesium oxide), though other configurations can be used. A coating similar to the coating 610 (FIG. 6) can also be applied to the inner surface of the sheath 930. In one configuration, the sheath 930 can be welded to the tube sheet 710, though other configurations can be used. The end 922 of the neutral cable 322 can form the neutral connection point 734. In the example provided, the neutral cable 322 is coaxial with the central axis 28, though other configurations can be used.

Referring to FIGS. 7 and 8, the insulator ring 738 is disposed coaxially about the central axis 28 and about the neutral connection point 734 and the sensor connection points 730. The busbars 714, 716, 718 are disposed about the insulator ring 738. The insulator ring 738 is an electrically insulating material such that the insulator ring 738 electrically insulates the neutral and sensor connection points 730, 734 from the busbars 714, 716, 718. The insulator ring 738 can also act to reduce noise in the sensors 314 that could otherwise be caused by the proximity of the sensor connection points 730 to the busbars 714, 716, 718.

Returning to the example provided, the insulator plates 742, 744, 746 are formed of an electrically insulating material. The insulator plates 742, 744, 746 are spaced apart from each other and extend radially outward from the insulator ring 738 to extend between corresponding adjacent ones of the busbars 714, 716, 718 and isolate the power phases carried by each busbar 714, 716, 718. The insulator plates 742, 744, 746 and the insulator ring 738 may be unitarily formed as a single insulating piece or may be separate pieces.

Referring to FIGS. 7-10, the busbars 714, 716, 718 are spaced apart from the tube sheet 710 in the axial direction. In the example provided, the insulator ring 738 abuts or is otherwise connected to the tube sheet 710, though other configurations can be used such as being supported spaced apart from the tube sheet 710 for example. The insulator plates 742, 744, 746 may also abut or be connected to the tube sheet 710.

In one form, the insulator body 750 is formed of a high dielectric strength potting compound that is disposed about the insulator ring 738 and completely encases the busbars 714, 716, 718. Thus, the power phases are isolated from the equipment ground, e.g., the enclosure tube 210 and the tube sheet 710. As best shown in FIG. 8, the electrical distribution posts 722, 724, 726 extend axially through the insulator body 750 such that power supply cables (not shown) can be connected to them to supply power to the busbars 714, 716, 718.

In an alternative configuration, not specifically shown, the insulator ring 738 may be omitted. In one such configuration, not specifically shown, an air gap or another insulating material radially inward of the busbars 714, 716, 718 can insulate the busbars 714, 716, 718 from each other in the radial direction and from any of the optional connection points such as the neutral connection point 734 and/or the sensor connection points 730 for example. In such a configuration, the insulator body 750 may be included or may be omitted. In one such configuration, not specifically shown, an air gap or other insulating material can insulate the busbars 714, 716, 718 from ground, e.g., the enclosure tube 210 and the tube sheet 710.

In another alternative configuration, not specifically shown, one or more of the insulator plates 742, 744, 746 can be omitted. In one such configuration, not specifically shown, an air gap or another insulating material between adjacent busbars 714, 716, 718 can insulate the busbars 714, 716, 718 from each other in the circumferential direction. In such a configuration, the insulator body 750 may be included or may be omitted. In one such configuration, not specifically shown, an air gap or other insulating material can insulate the busbars 714, 716, 718 from ground, e.g., the enclosure tube 210 and the tube sheet 710.

In still another alternative configuration, not specifically shown, both the insulator ring 738 and the insulator plates 742, 744, 746 can be omitted with an air gap or other insulating material providing sufficient insulating properties. In such a configuration, the insulator body 750 may be included or may be omitted. In one such configuration, not specifically shown, an air gap or other insulating material can insulate the busbars 714, 716, 718 from ground, e.g., the enclosure tube 210 and the tube sheet 710.

Returning to FIG. 2, the terminal enclosure 754 can include an enclosure tube 210 and an end cap 218. The enclosure tube 210 is welded to the tube sheet 710 and defines a terminal enclosure cavity 222 within which the insulator body 750 (FIG. 8), insulator ring 738 (FIGS. 7 and 8), insulator plates 742, 744, 746 (FIG. 8), busbars 714, 716, 718 (FIG. 7), electrical distribution posts 722, 724, 726 (FIGS. 7 and 8), sensor connection points 730 (FIG. 7), and neutral connection point 734 (FIGS. 7 and 8) are encased. The end cap 218 can be removably coupled to the enclosure tube 210 such as by a mating flange 226 and fasteners 234 (e.g., bolts and nuts). The end cap 218 or enclosure tube 210 may have apertures (not shown) through which power cables (not shown) and data cables (not shown) may extend. Alternatively, the end cap 218 can be omitted and the flange 226 or tube sheet 710 can be coupled to another piece of equipment or support structure (not shown). In the example provided, the enclosure tube 210 is a cylindrical shape, though other shapes (e.g., flat sided box) can be used.

Figure 12:
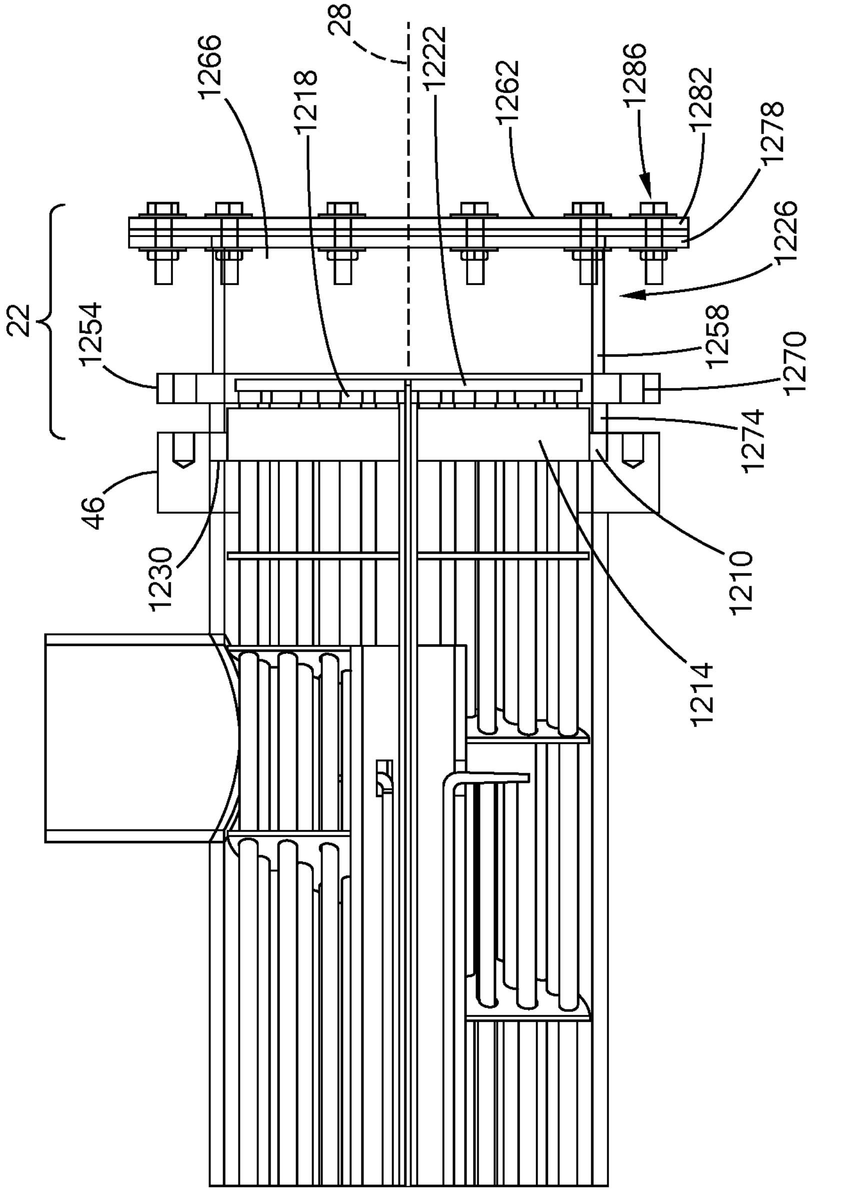
FIG. 12 is a cross-sectional view of a neutral terminal portion of the electric heater of FIG. 1 in accordance with the teachings of the present disclosure.
Figure 14:
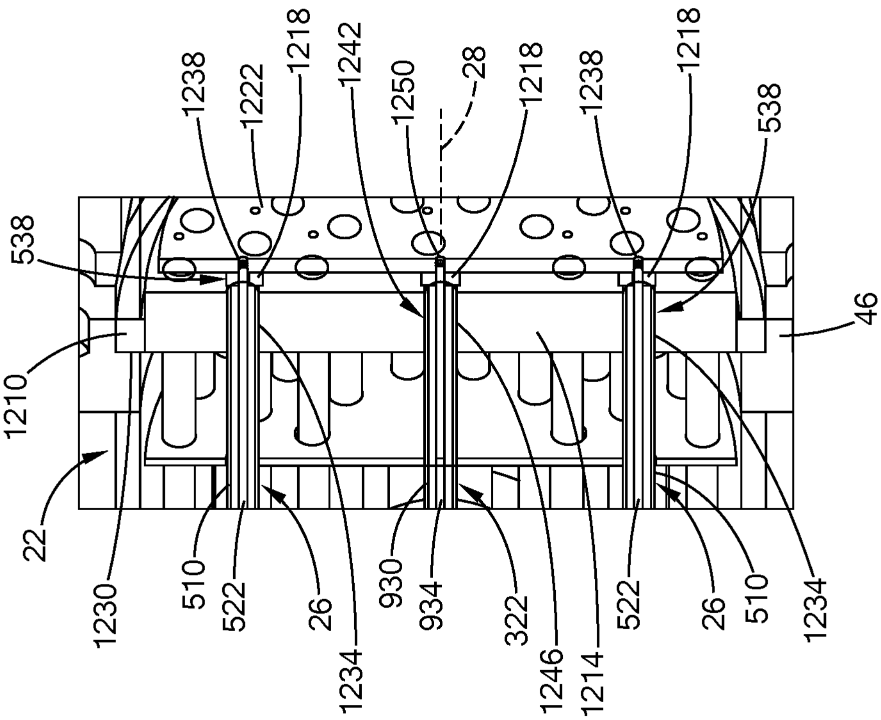
FIG. 14 is a perspective cross-sectional view of the neutral terminal portion of FIG. 14.
Figure 13:
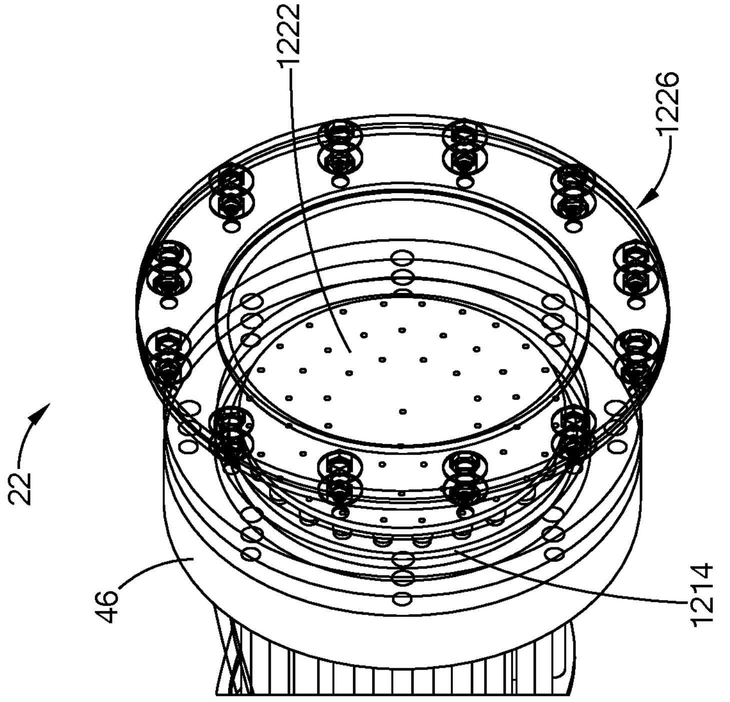
FIG. 13 is a perspective view of the neutral terminal portion of FIG. 12.

Referring to FIGS. 12-14, the neutral terminal portion 22 includes a seal member 1210, a floating end wall or floating tube sheet 1214, at least one insulator spacer 1218, a neutral busbar 1222, and a neutral terminal enclosure 1226 (shown transparently in FIG. 13 for clarity). The second shell flange 46 defines a packing recess 1230 disposed about the central axis 28. The seal member 1210 is seated in the packing recess 1230 and disposed about the floating tube sheet 1214. The floating tube sheet 1214 is a generally disc shaped body. The end 538 of each heating element 26 extends into and through bores 1234 in the floating tube sheet 1214 in a sealed manner that inhibits fluid from traversing the floating tube sheet 1214 through the bores 1234. For example, each sheath 510 can be welded to the floating tube sheet 1214, though other configurations can be used. The neutral pin 522 of each heating element 26 is coupled to the neutral busbar 1222 for electrical communication therewith. In the example provided, each neutral pin 522 is received into a corresponding bore 1238 in the neutral busbar 1222 and plug welded therein, though other configurations can be used.

An end 1242 of the neutral cable 322 extends into and through a bore 1246 in the floating tube sheet 1214 in a sealed manner that inhibits fluid from traversing the floating tube sheet 1214 through the bore 1246. In one configuration, the sheath 930 can be welded to the floating tube sheet 1214, though other configurations can be used. The pin 934 of the neutral cable 322 is coupled to the neutral busbar 1222 for electrical communication therewith. In the example provided, the pin 934 of the neutral cable 322 is received into a bore 1250 in the neutral busbar 1222 and plug welded therein, though other configurations can be used.

In the example provided, the sheath 510 of each heating element 26 and the sheath 930 of the neutral cable 322 are spaced apart from the neutral busbar 1222 by a corresponding insulator spacer 1218. The insulator spacers 1218 are an electrically insulating material. In an alternative configuration, not shown, a single insulator spacer can span across the neutral busbar 1222 to insulate the sheaths 510, 930 therefrom. The insulator spacers 1218 also act to space the neutral busbar 1222 apart from the floating tube sheet 1214. The neutral busbar 1222 is also spaced apart from the neutral terminal enclosure 1226 that encapsulates it.

Referring to FIG. 12, the neutral terminal enclosure 1226 includes a packing flange 1254 and can include an enclosure tube 1258 and an end cap 1262. The enclosure tube 1258 is welded to the packing flange 1254 and they cooperate to define a neutral terminal cavity 1266 within which the neutral busbar 1222 is encased. The packing flange 1254 is removably coupled to the second shell flange 46 such as by fasteners (not shown). In the example provided, screws (not shown) are received through bores 1270 in the packing flange 1254 and threaded into the second shell flange 46. The packing flange 1254 has a tubular protrusion 1274 that aligns with the packing recess 1230. As the packing flange 1254 is tightened to the second shell flange 46, the tubular protrusion 1274 compresses the seal member 1210 to form a seal between the second shell flange 46, the floating tube sheet 1214, and the packing flange 1254. The end cap 1262 can be removably coupled to the enclosure tube 1258 such as by mating flanges 1278, 1282 and fasteners 1286 (e.g., bolts and nuts). In the example provided, the enclosure tube 1258 is a cylindrical shape, though other shapes (e.g., flat sided box) can be used.

Figure 15:
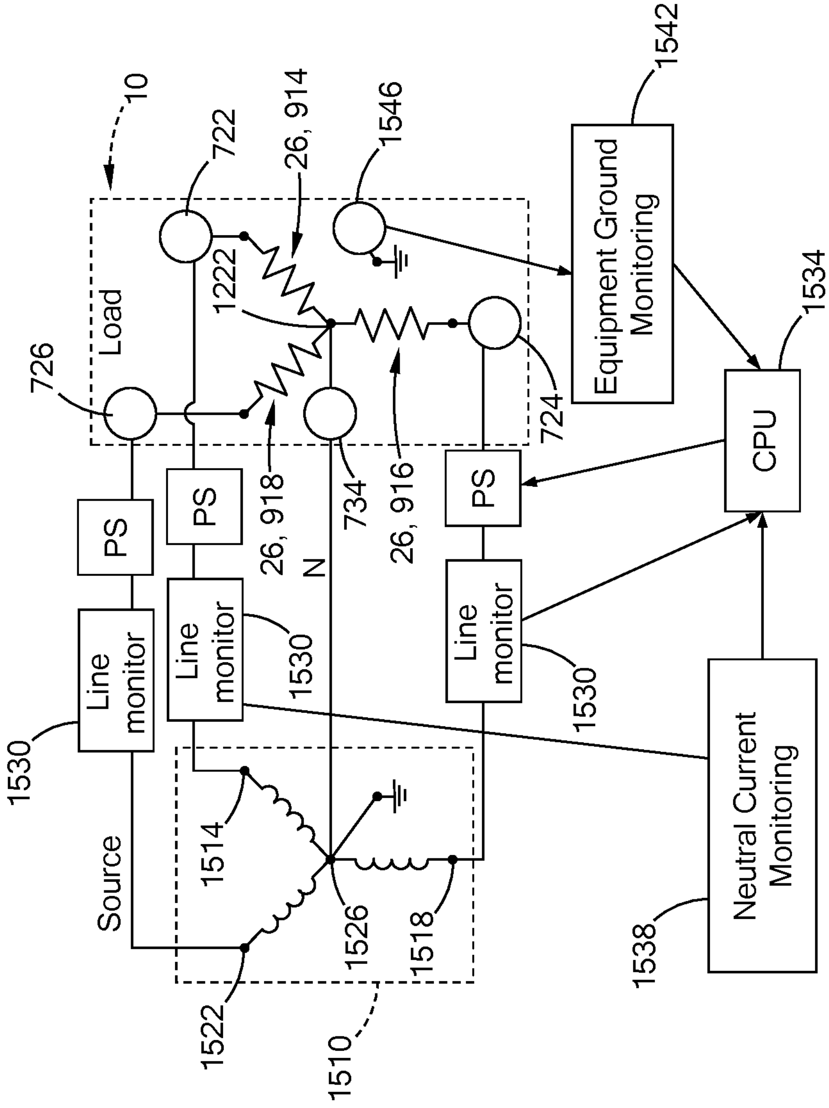
FIG. 15 is a schematic electrical diagram of the electric heater of FIG. 1 in accordance with the teachings of the present disclosure.

Referring to FIG. 15, an electrical diagram including the electric heater 10 is schematically illustrated. The electric heater 10 is configured to receive power from a medium voltage three-phase power source 1510 such as a grounded wye or delta source for example. In the example provided, the power source 1510 provides a line voltage of 6,600V, though other medium voltage configurations can be used such as between 2,000V and 20,000V for example. A first line output 1514 of the power source 1510 is connected to the first electrical distribution post 722, a second line output 1518 is connected to the second electrical distribution post 724, and a third line output 1522 is connected to the third electrical distribution post 726. The first line output 1514 can be configured to output the first power phase, the second line output 1518 can be configured to output the second power phase, and the third line output 1522 can output the third power phase. The neutral connection point 734 is coupled to a neutral terminal 1526 of the power source 1510. In one alternative configuration, not specifically shown, the neutral cable 322 and neutral connection point 734 can be omitted such that the neutral busbar 1222 is not connected to the neutral terminal 1526 of the power source 1510 (e.g., floating neutral).

In the example provided, line monitors 1530 are connected to a controller 1534 (e.g., a CPU) and configured to monitor power output for each phase. The controller 1534 is configured for real time computing of the phase imbalances from the power source 1510. This enables the prediction of anticipated neutral current levels and allows for proactive maintenance and shut down of the electric heater 10. In the example provided, a neutral monitoring device 1538 can also optionally be connected to the controller 1534 and configured to monitor the neutral current. The controller 1534 can be configured to shut off the electric heater 10 if the neutral current exceeds a predetermined value. Any discrepancy between the predicted neutral current and the actual neutral current can be isolated to a load imbalance developing in the electric heater 10. In an alternative configuration where the neutral cable 322 and neutral connection point 734 are omitted, not specifically shown, the neutral monitoring device 1538 may be omitted or optionally connected to the neutral busbar 1222 in another manner such as through the end cap 1262 for example.

A ground monitor 1542 can also optionally be connected to the controller 1534 and configured to detect isolation breakdown of the equipment ground 1546. The controller 1534 can be configured to shut down the electric heater 10 if such an isolation breakdown occurs. In one configuration, the controller 1534 can also be configured to independently control or vary the power provided to each electrical distribution post 722, 724, 726 to either maintain balanced load or provide a desired heating profile.

Figure 16:
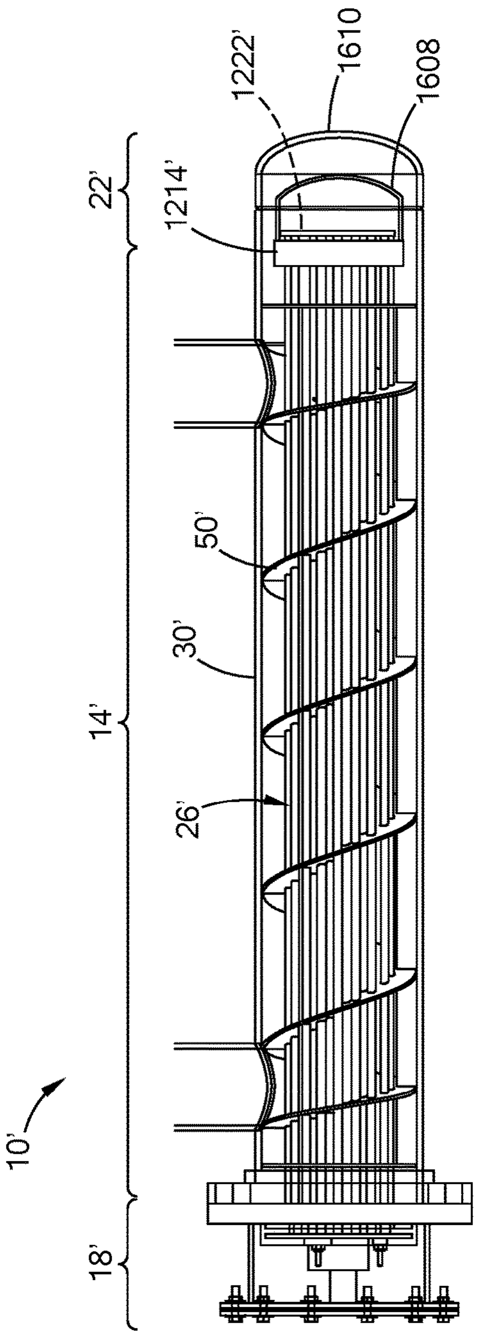
FIG. 16 is a side view of an electric heater of a second configuration in accordance with the teachings of the present disclosure.

Referring to FIG. 16, an electric heater 10' of a second configuration is illustrated. The electric heater 10' and tube 30' can be similar to the electric heater 10 and tube 30 (FIGS. 1-15) except as otherwise shown or described herein. Similar features are described with similar but primed reference numerals. Thus, only differences are described herein in detail. The electric heater 10' lacks the second shell flange 46 (FIGS. 12-14) and the neutral terminal portion 22' lacks the seal member 1210 (FIGS. 12-14). In the example provided, the neutral busbar 1222' is similar to the neutral busbar 1222 (FIGS. 12-14) but is encapsulated by the floating tube sheet 1214' and an inner cap 1608 that do not contact the tube 30'. In the example provided, the inner cap 1608 is affixed (e.g., welded) directly to the floating tube sheet 1214' to inhibit the neutral bus bar 1222' from being exposed to the fluid flowing within the tube 30'. In the example provided, a cap 1610 is affixed (e.g., welded) directly to the end of the tube 30'.

In one alternative configuration, not specifically shown, the tube 30' and end cap 1610 is omitted and the electric heater 10' can be attached to a vessel such that the heating elements 26' are submersed in a fluid within the vessel. In this alternative configuration, the baffle 50' may be replaced with a supports (not shown) that can provide additional support to the heating elements 26'.

Figure 17:
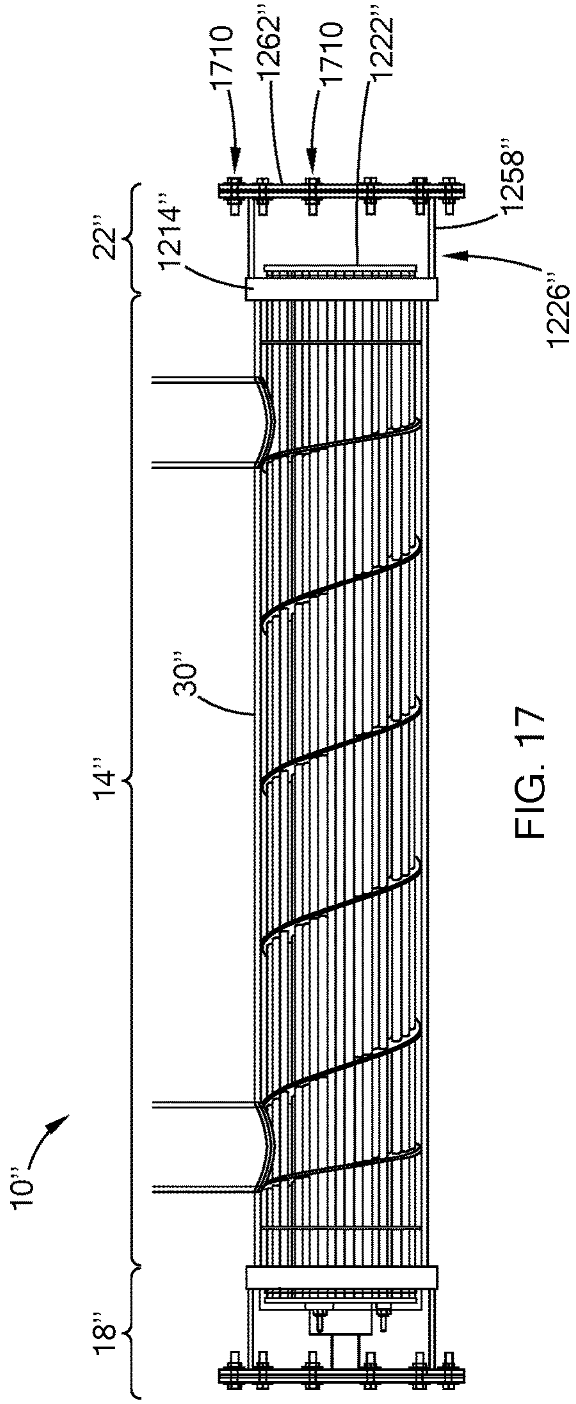
FIG. 17 is a side view of an electric heater of a third configuration in accordance with the teachings of the present disclosure.

Referring to FIG. 17 an electric heater 10" of a third configuration is illustrated. The electric heater 10" and tube 30" can be similar to the electric heater 10 and tube 30 (FIGS. 1-15) and 10' and 30' (FIG. 16) except as otherwise shown or described herein. Similar features are described with similar but double primed reference numerals. Thus, only differences are explained in detail herein. The tube sheet 1214" is similar to the floating tube sheet 1214' except that the tube sheet 1214" is fixedly coupled to the tube 30". In the example provided, the tube sheet 1214" is welded to the end of the tube 30" and fluid is inhibited from reaching the neutral busbar 1222'. In the example provided, the neutral terminal enclosure 1226" includes a tubular portion 1258" coupled (e.g., welded) to the tube sheet 1214" and removably coupled to the end cap 1262" by fasteners 1710 (e.g. bolts and nuts).

Figure 18:
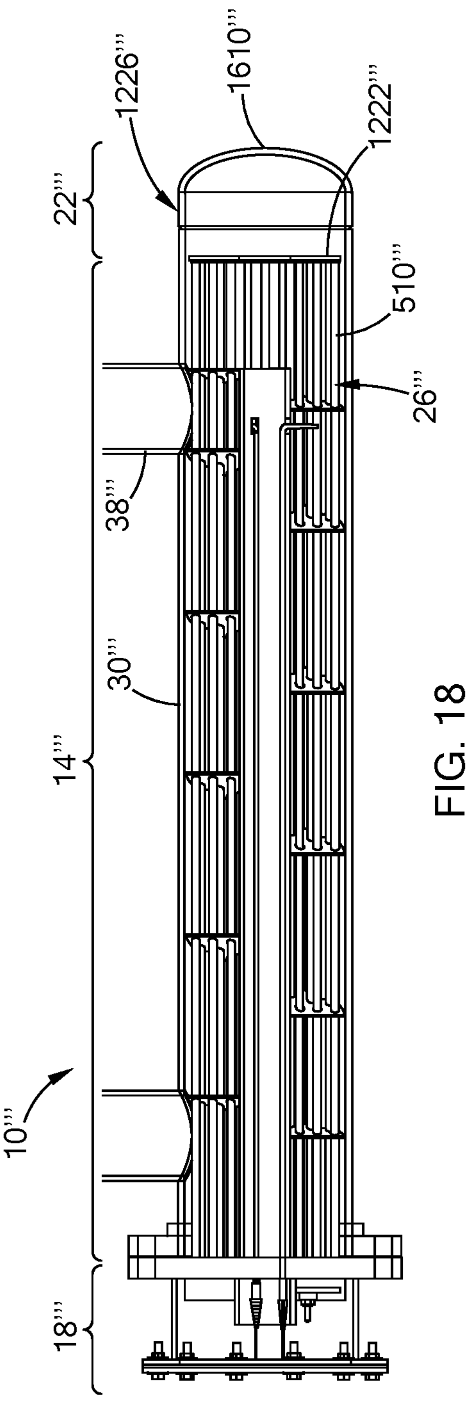
FIG. 18 is a side view of an electric heater of a fourth configuration in accordance with the teachings of the present disclosure.
Figure 19:
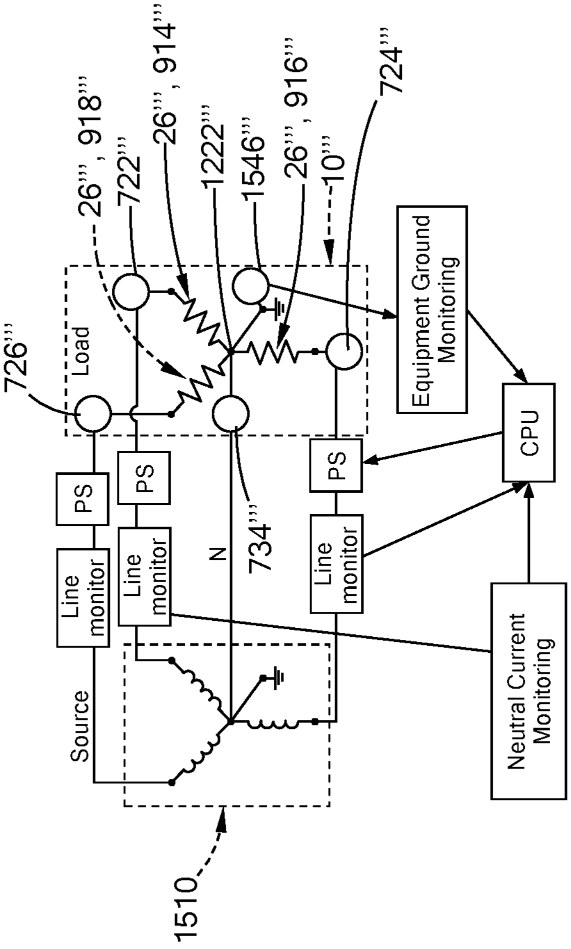
FIG. 19 is a schematic electrical diagram of the electric heater of FIG. 18 in accordance with the teachings of the present disclosure.

Referring to FIGS. 18 and 19, an electric heater 10''' of a fourth configuration is illustrated. The electric heater 10''' and tube 30''' are similar to the electric heater 10' and tube 30' (FIG. 16) except as otherwise shown or described here. Similar features are described with reference to similar but triple primed reference numerals. Thus, only differences are described herein. The electric heater 10''' is a non-isolated neutral configuration in which the electric heater 10''' lacks the neutral cable 322 (FIGS. 1-15), the floating tube sheet 1214' (FIG. 16) and the insulator spacers 1218 (FIG. 14). Instead, the sheath 510''' of each heating element 26''' is also coupled to the neutral busbar 1222''' for electrical communication therewith. Therefore, the sheaths 510''' act as the neutral wire to carry the current back to the power source 1510 via the equipment ground 1546 such that the neutral is not isolated from the equipment ground 1546, in this configuration.

Figure 20:
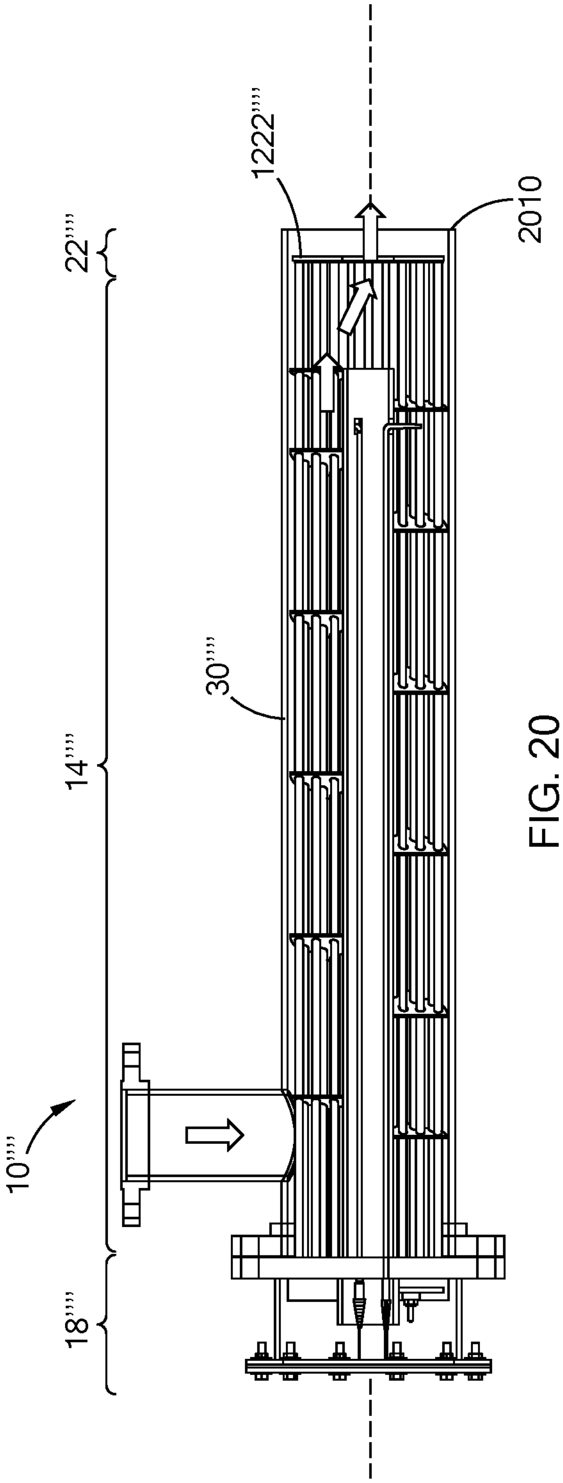
FIG. 20 is a cross-sectional view of an electric heater of a fifth configuration.
Figure 21:
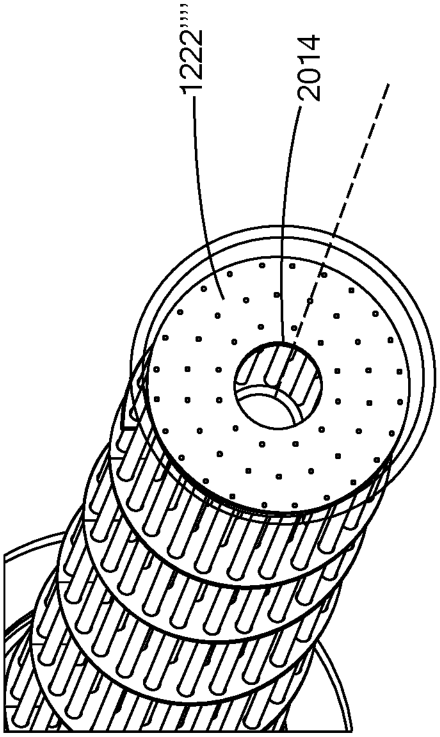
FIG. 21 is a perspective view of a portion of the electric heater of FIG. 20.

Referring to FIGS. 20 and 21, an electric heater 10'''' of a fifth configuration is illustrated. The electric heater 10'''' is similar to the electric heater 10''' (FIGS. 18 and 19) except as otherwise shown or described herein. Similar features are described with reference to similar but quadruple primed reference numerals. Thus, only differences are described herein. The electric heater 10'''' lacks the second input/output 38''' (FIG. 18) and the neutral terminal enclosure 1226'''. Instead, an axial end 2010 of the tube 30'''' is open. The end 2010 of the tube 30'''' can be coupled to another pipe or flowpath (not shown) to provide fluid flow thereto. The neutral busbar 1222'''' is an annular shape defining a central bore 2014 through which the fluid can flow axially.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electric heater comprising:

a first busbar, a second busbar, and a third busbar;

a neutral busbar;

a plurality of first heating elements, a first end of each first heating element being coupled to the first busbar for electrical communication therewith, a second end of each first heating element being coupled to the neutral busbar for electrical communication therewith;

a plurality of second heating elements, a first end of each second heating element being coupled to the second busbar for electrical communication therewith, a second end of each second heating element being coupled to the neutral busbar for electrical communication therewith;

a plurality of third heating elements, a first end of each third heating element being coupled to the third busbar for electrical communication therewith, a second end of each third heating element being coupled to the neutral busbar for electrical communication therewith;

a tube;

a first inlet/outlet; and a second inlet/outlet, wherein the first, second, and third heating elements are disposed within a flow path of the tube, wherein the first inlet/outlet is in fluid communication with the flow path and is proximate to the first ends of the first, second, and third heating elements, and wherein the second inlet/outlet is in fluid communication with the flow path and is proximate to the second ends of the first, second, and third heating elements.

2. The electric heater according to claim 1, further comprising a first end wall, the first ends of the first, second, and third heating elements extending through the first end wall, the first end wall isolating the first, second, and third busbars from a heating portion of the electric heater, the heating portion being configured to output heat to a working fluid.

3. The electric heater according to claim 2, wherein the first, second, and third busbars are separated from each other by insulator plates.

4. The electric heater according to claim 2 further comprising a neutral cable, a first end of the neutral cable extending through the first end wall, a second end of the neutral cable being coupled to the neutral busbar for electrical communication therewith.

5. The electric heater according to claim 4, wherein the first, second, and third busbars are disposed radially outward of the first end of the neutral cable and are electrically insulated therefrom by an insulator ring disposed about the neutral cable.

6. The electric heater according to claim 5 further comprising a central support tube extending between the first end wall and the neutral busbar, the first, second, and third heating elements being arranged about the central support tube, wherein the neutral cable extends within the central support tube.

7. The electric heater according to claim 2 further comprising a plurality of insulator plates, each insulator plate being disposed between adjacent ones of the first, second, and third busbars.

8. The electric heater according to claim 2, wherein the neutral busbar is configured to be in contact with the working fluid of the electric heater.

9. The electric heater according to claim 2 further comprising a second end wall, the second ends of the first, second, and third heating elements extending through the second end wall, the second end wall isolating the neutral busbar from the heating portion of the electric heater.

10. The electric heater according to claim 9, further comprising a plurality of spacers configured to space the neutral busbar apart from the second end wall.

11. The electric heater according to claim 1, wherein the first, second, and third busbars are surrounded by dielectric potting material.

12. The electric heater according to claim 11 further comprising a first electrical terminal, a second electrical terminal, and a third electrical terminal, the first electrical terminal coupled to the first busbar and extending through the dielectric potting material, the second electrical terminal coupled to the second busbar and extending through the dielectric potting material, the third electrical terminal coupled to the third busbar and extending through the dielectric potting material.

13. The electric heater according to claim 1, wherein the neutral busbar defines a bore configured to permit a working fluid to flow through.

14. The electric heater according to claim 1, further comprising a helical baffle disposed within the flow path of the tube, wherein the plurality of first heating elements, the plurality of second heating elements, and the plurality of third heating elements extend through perforations in the helical baffle.

15. An electric heater comprising:

a first busbar, a second busbar, and a third busbar;

a neutral busbar;

a plurality of first heating elements, a first end of each first heating element being coupled to the first busbar for electrical communication therewith, a second end of each first heating element being coupled to the neutral busbar for electrical communication therewith;

a plurality of second heating elements, a first end of each second heating element being coupled to the second busbar for electrical communication therewith, a second end of each second heating element being coupled to the neutral busbar for electrical communication therewith;

a plurality of third heating elements, a first end of each third heating element being coupled to the third busbar for electrical communication therewith, a second end of each third heating element being coupled to the neutral busbar for electrical communication therewith; and a first end wall, the first ends of the first, second, and third heating elements extending through the first end wall, the first end wall isolating the first, second, and third busbars from a heating portion of the electric heater, the heating portion being configured to output heat to a working fluid; and a central support tube extending from the first end wall toward the neutral busbar, wherein the first, second, and third heating elements are arranged about the central support tube.

16. The electric heater of claim 15, wherein each of the first, second, and third busbars are insulated from each other by an insulating material extending radially inward.

17. The electric heater of claim 15, wherein an insulating material surrounds each of the heating elements, and the insulating material defines a cavity at ends of the heating elements.

18. The electric heater according to claim 15, further comprising: a neutral cable, a first end of the neutral cable extending through the first end wall, a second end of the neutral cable being coupled to the neutral busbar for electrical communication therewith, wherein the neutral cable extends within the central support tube.

19. The electric heater according to claim 15, further comprising a helical baffle disposed about the central support tube, wherein the plurality of first heating elements, the plurality of second heating elements, and the plurality of third heating elements extend through perforations in the helical baffle.

20. An electric heater comprising:

a first busbar, a second busbar, and a third busbar;

a neutral busbar;

a plurality of first heating elements, a first end of each first heating element being coupled to the first busbar for electrical communication therewith, a second end of each first heating element being coupled to the neutral busbar for electrical communication therewith;

a plurality of second heating elements, a first end of each second heating element being coupled to the second busbar for electrical communication therewith, a second end of each second heating element being coupled to the neutral busbar for electrical communication therewith;

a plurality of third heating elements, a first end of each third heating element being coupled to the third busbar for electrical communication therewith, a second end of each third heating element being coupled to the neutral busbar for electrical communication therewith; and a first end wall, the first ends of the first, second, and third heating elements extending through the first end wall, the first end wall isolating the first, second, and third busbars from a heating portion of the electric heater, the heating portion being configured to output heat to a working fluid, wherein the neutral busbar is configured to be in contact with the working fluid of the electric heater.

* * * * *